United States Patent [19]
Van Allman et al.

[11] Patent Number: 5,181,886
[45] Date of Patent: Jan. 26, 1993

[54] METHOD AND APPARATUS FOR MAKING A FORMING PIN

[75] Inventors: Don T. Van Allman, Palatine, Ill.; Amos Corbin, Cynthiana, Ky.

[73] Assignee: Illinois Tool Works Inc., Glenview, Ill.

[21] Appl. No.: 851,065

[22] Filed: Mar. 13, 1992

[51] Int. Cl.⁵ .................................................. B21G 3/00
[52] U.S. Cl. ...................................... 470/40; 470/125; 470/146; 470/160
[58] Field of Search .................. 470/40, 121, 125, 130, 470/136, 141, 146, 147, 148, 156, 160, 192, 195, 28, 31, 34, 86, 161; 411/451, 455, 487; 72/325, 416, 294, 71

[56] References Cited

U.S. PATENT DOCUMENTS

| | | | |
|---|---|---|---|
| 1,933,317 | 10/1933 | Curtis | 411/451 |
| 2,761,157 | 9/1956 | Chism | 470/125 |
| 3,234,572 | 2/1966 | Ruser | 470/195 |
| 3,604,034 | 9/1971 | Leistner | 470/130 |
| 3,828,604 | 8/1974 | Shelton | 470/86 |
| 4,279,190 | 7/1981 | Hummel | 411/451 |
| 4,563,890 | 1/1986 | Dickson | 72/71 |
| 4,576,033 | 3/1986 | Corrette | 72/71 |
| 4,881,395 | 11/1989 | Shinjo | 470/40 |

*Primary Examiner*—Robert L. Spruill
*Assistant Examiner*—Michael J. McKeon
*Attorney, Agent, or Firm*—Schwartz & Weinrieb

[57] ABSTRACT

A forming pin having a shank, a head, a point, and a pair of like grooves on opposite sides of the shank is made by gripping an elongate wire in a position wherein an end of the wire is exposed, forming a head at the exposed end of the wire while gripped, advancing the wire by a predetermined distance, and simultaneously forming the point and forming the grooves. The forming pin thus formed is severed from the remaining wire as the point and the grooves are formed. A pair of dies are used, which are movable so as to pinch the wire therebetween, along with mechanisms for closing the dies. The dies are configured similarly to define suitable forming edges.

12 Claims, 1 Drawing Sheet

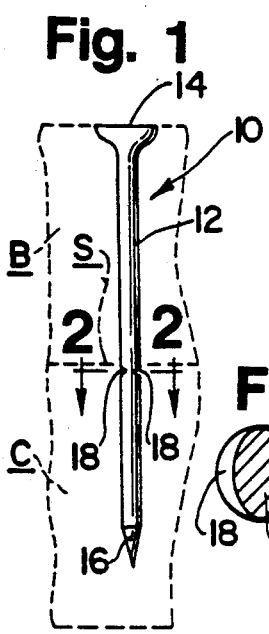
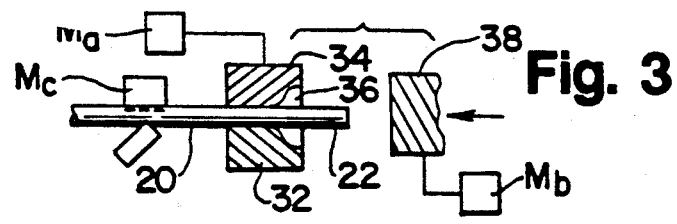
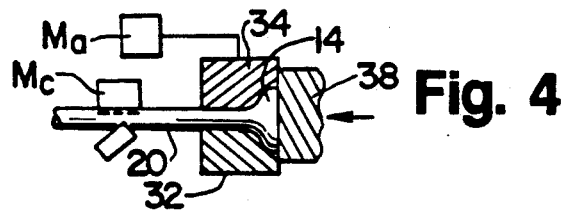
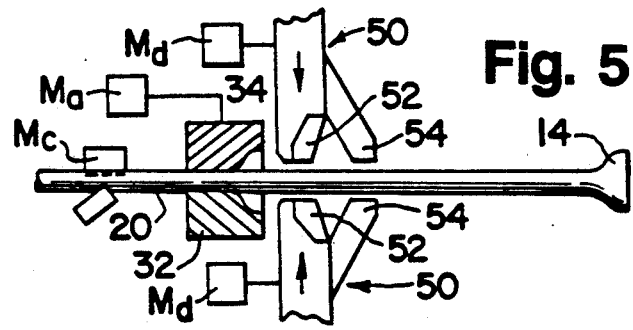
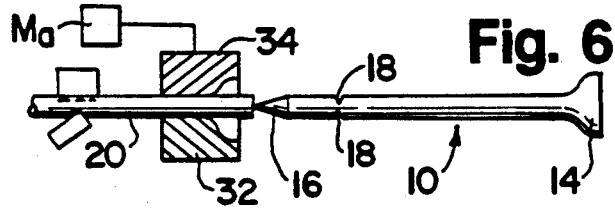
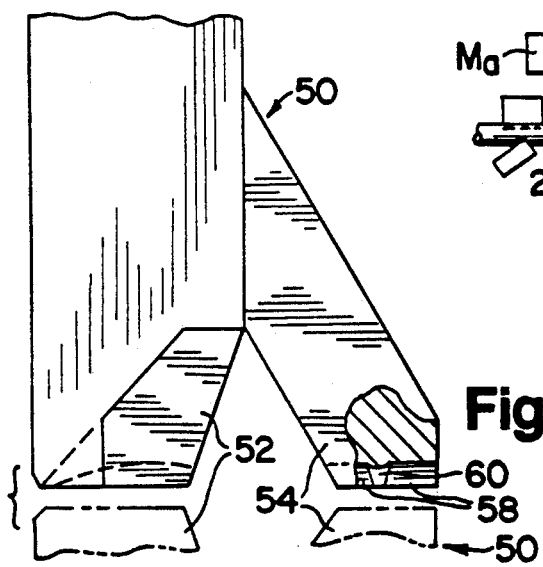
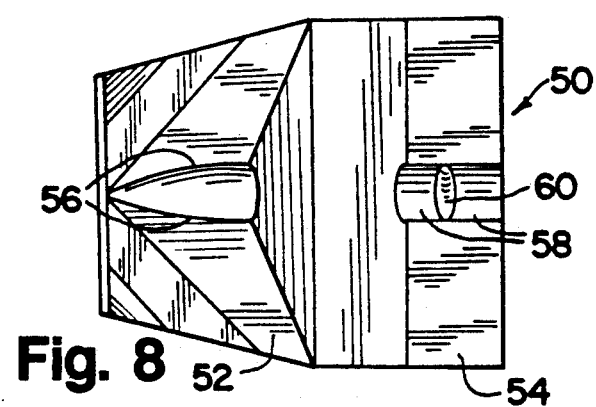
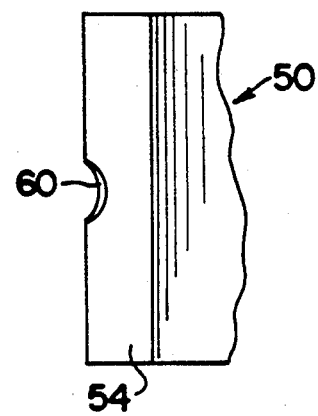

METHOD AND APPARATUS FOR MAKING A FORMING PIN

TECHNICAL FIELD OF THE INVENTION

This invention pertains to a method for making a forming pin having a groove enabling a protruding portion of the forming pin when driven into a workpiece to be severed at the groove.

BACKGROUND OF THE INVENTION

A forming pin is a specialized, hardened fastener, which resembles a nail. Forming pins are used to fasten a wooden board temporarily to a concrete substrate, as in the erection of concrete-pouring forms. Forming pins are driven through the wooden board, into the concrete substrate, usually by a powered tool. Commonly, forming pins are driven by a powder-actuated tool, such as one of the powder-actuated tools available commercially from ITW Ramset/Red Head (a division of Illinois Tool Works Inc.) of Wood Dale, Ill., under its RAMSET/RED HEAD trademark.

When it is desired to remove the wooden board from the concrete substrate, the wooden board is pried off the forming pin. Thus, a portion of the forming pin remains embedded in the concrete substrate, and a portion of the forming pin protrudes from the concrete substrate. The protruding portion must be then removed. It is known to provide the forming pin with a circumferential groove, which is rolled or cut into its shank. The groove enables the protruding portion to be repeatedly bent back and forth until it is severed from the embedded portion at the groove.

Heretofore, to provide a forming pin with such a groove on its shank, it has been known to perform a secondary operation, such as a rolling or cutting operation. The secondary operation adds significantly to the manufacturing time and overall manufacturing cost of the forming pin. Hence, there has been a need, to which this invention is addressed, for a less time consuming, less costly way to provide a forming pin with a suitable groove.

SUMMARY OF THE INVENTION

Addressing the aforenoted need, this invention provides an improved method for making a forming pin having a groove to enable a protruding portion of the forming pin when driven into a workpiece to be severed at the groove. The improved method does not require a secondary operation to provide the groove.

Broadly, the improved method comprises steps of gripping an elongate wire firmly in a position wherein an end of the wire is exposed, forming a head at the exposed end of the wire while gripped, advancing the wire by a predetermined distance, and simultaneously forming a point on the advanced wire and forming a groove reducing the cross-section of the advanced wire. The improved method produces a forming pin, which may be then hardened, as by an austempering process.

The wire may be firmly gripped while the point and the groove are being formed. The groove may be advantageously formed by displacing material of the wire to form the groove without removing any material at the groove. The forming pin may be advantageously severed from the remaining wire at the point simultaneously with forming the point and forming the groove. Preferably, a pair of such grooves are formed on opposite sides of the advanced wire.

Preferably, the simultaneous steps of forming the point, forming the groove, and severing the forming pin from the remaining wire are effected by pinching the advanced wire between a pair of dies configured to form the point, form the groove, and sever the forming pin from the remaining wire at the point.

Moreover, this invention provides a pair of dies for forming a point on an elongate wire and for forming a groove reducing the cross-section of the wire, as combined with means for closing the dies so as to pinch the wire between the dies. The dies are configured to define means for simultaneously forming a point on the wire and forming a groove reducing the cross-section of the wire when the dies are closed.

The dies may be also configured to define means for severing the wire at the point when the dies are closed so as to pinch the wire therebetween. The dies may be also configured similarly to define means for simultaneously forming a pair of such grooves on opposite sides of the wire when the dies are closed so as to pinch the wire therebetween.

BRIEF DESCRIPTION OF THE DRAWINGS

These and other objects, features, and advantages of this invention are evident from the following description of a preferred mode for carrying out the improved method of this invention with reference to the accompanying drawings, in which like reference characters designate like or corresponding parts throughout the several views, and wherein:

FIG. 1 is an elevational view of a forming pin made by the improved method provided by this invention.

FIG. 2, on an enlarged scale, is a cross-sectional view taken along line 2—2 of FIG. 1 in a direction indicated by arrows.

FIGS. 3, 4, 5, and 6, on the scale of FIG. 1, are sequential, schematic views illustrating successive steps in making a forming pin by the improved method of this invention.

FIG. 7, on a greatly enlarged scale, is a fragmentary, partly broken away, elevational view of one of a pair of matched dies used in making a forming pin by the improved method provided by this invention. The other die of the pair is shown fragmentarily in dashed lines.

FIG. 8 is an end view of the die shown in full lines in FIG. 7.

FIG. 9 is a plan view of the die shown in FIGS. 7 and 8.

DETAILED DESCRIPTION OF THE PREFERRED MODE

As shown in FIGS. 1 and 2, the forming pin is made by the improved method provided by this invention. Successive steps in a preferred mode for carrying out such method are illustrated in FIGS. 3, 4, 5, and 6.

The forming pin 10 has a shank 12, a head 14 formed on one end of the shank 12, a point 16 formed on the other end of the shank 12, and two grooves 18 formed on opposite sides of the shank 12. The grooves 18 are formed between the head 14 and the point 16 so as to be somewhat closer to the point 16 than to the head 14. The shank 12 has a uniform, circular cross-section, except where the grooves 18 reduce its cross-section to an elliptical cross-section shown in FIG. 2. The point 16 has a so-called "ballistic" shape, which has been used heretofore for forming pins.

In the erection of a concrete-pouring form (see FIG. 1) the forming pin 10 is driven through a wooden board B shown fragmentarily in dashed lines, into a concrete substrate C shown fragmentarily in dashed lines, so as to embed a lower portion of the forming pin 10 in the concrete substrate C approximately as far as the grooves 18. In practice, the board B is connected to the concrete C to provide a building form to receive additional concrete such as curbs, walls, footers, etc. Ideally, the grooves 18 should be sightly below or approximately level with the concrete surface S facing the wooden board B, not above such surface S. When the wooden board B has been pried off the forming pin 10, the protruding portion of the forming pin 10 can be then severed from the embedded portion thereof at the grooves 18 by bending the protruding portion repeatedly back and forth. Ideally, after the protruding portion has been severed therefrom, the embedded portion of the forming pin 10 does not protrude from the concrete surface S.

The forming pin 10 is made from an elongate wire 20 of a suitable steel, such as AISI 1062 alloy steel, which is preferred. The forming pin 10 is hardened, after it has been made, by an austempering process.

As shown schematically in FIGS. 3, 4, 5, and 6, the forming pin 10 is made by a series of sequential steps in a nail-forming machine. Initially, as shown in FIG. 3, the wire 20 is gripped firmly in a position wherein an end 22 of the wire 20 is exposed. Thereupon, as shown in FIG. 4, the head 14 is formed at the exposed end 22 of the wire 20 while the wire 20 is gripped. Next, as shown in FIG. 5, the wire 20 is advanced by a predetermined distance whereupon the wire 20 is gripped firmly. In subsequent, simultaneous steps, the point 16 is formed on the wire 20 and the grooves 18 reducing the cross-section of the wire 20 are formed on opposite sides of the advanced wire 20. The forming pin 10 thus produced is severed from the remaining wire 20 simultaneously with the point 16 being formed and with forming the grooves 18 being formed.

The forming pin 10 is made in a nail-making machine of a type known heretofore, such as a Wafios Model N51 Nail-Making Machine, which is available commercially from Wafios Maschinenfabrik GmbH & Co. KG of Reutlingen, Germany.

The nail-making machine includes a pair of gripping jaws 32, 34, which define a gripping axis. The gripping jaws 32, 34, are similar to the gripping jaws provided conventionally in a nail-making machine of the type noted above. The gripping jaw 32 is mounted fixedly in the nail-making machine. The gripping jaw 34 is mounted movably in the nail-making machine so as to be transversely moveable toward and away from the gripping jaw 32. The nail-making machine includes a mechanism $M_a$, which is conventional in such a machine, for moving the gripping jaw 34 toward and away from the gripping jaw 32. The gripping jaws 32, 34 are configured so that in a closed condition, in which the gripping jaws 32, 34 grip the elongate wire 20 firmly, the gripping jaws 32, 34 define a head-forming cavity 36, in which the head 14 is formed from the exposed end 22 of the wire 20. In an opened condition, in which the gripping jaw 34 is moved away from the gripping jaw 32 by a slight distance, the gripping jaws 32, 34 permit the elongate wire 20 to be axially advanced. The gripping jaws 32, 34 are used to grip the wire 20 firmly when the head 14 is being formed and when the point 16 and the grooves 18 are being formed and the forming pin 10 is being severed from the remaining wire 20.

The nail-making machine also includes a punch 38, which is conventional in such a machine. The punch 38 is arranged to be axially moveable toward and away from the gripping jaws 32, 34. The nail-making machine further includes a mechanism $M_b$, which also is conventional in such a machine, for moving the punch 38 toward and away from the gripping jaws 32, 34. The punch 38 is used to form the head 14 from the exposed end 22 of the wire 20 by deforming the exposed end 2 into the head-forming cavity 36 when the punch 38 is moved toward the gripping jaws 32, 34. The nail-making machine includes a feed dog mechanism $M_c$, which also is conventional in such a machine, for advancing the elongate wire 20 axially when the gripping jaws 32, 34 are in the opened condition.

As shown in FIGS. 5, 7, 8 and 9, a pair of matched dies 50, which embody certain aspects of this invention, are provided in the nail-making machine. The dies 50 replace the dies provided conventionally in a nail-making machine of the type noted above. The nail-making machine includes mechanisms $M_d$, which are conventional in such a machine, for opening and closing the dies 50. When opened, the dies 50 permit the wire 20 to be axially advanced between the dies 50. When closed, the dies 50 pinch the advanced wire 20 therebetween. As the dies 50 are closed, the dies 50 form the point 16 on the advanced wire 20, form the grooves 18 on opposite sides of the advanced wire 20, and sever the forming pin 10 formed thereby from the remaining wire 20 at the point 16. There is no need, therefore, for a secondary operation to provide the grooves 18.

As shown in FIGS. 5, 7, 8, and 9, each die 50 is bifurcated so as to have a point-forming and pin-severing portion 52 and a groove-forming portion 54. The point-forming and pin-severing portion 52 has two curved edges 56 configured to form the point 16 and to sever the forming pin 10 from the remaining wire 20 when the dies 50 are moved from the opened condition into the closed condition. The groove-forming portion 54 has two semi-cylindrical channels 58 conforming to the wire 20 and straddling a curved wedge 60. The curved wedge 60 is adapted to form one of the grooves 18, by displacing some of the steel of the wire 20 without removing any of such steel, when the dies 50 are moved from the opened condition into the closed condition.

Various modifications may be made in the preferred embodiment described above without departing from the scope and spirit of this invention which is determined by means of the appended claims. It is therefore to be understood that within the scope of the appended claims, the present invention may be practiced otherwise than as specifically described herein.

We claim:

1. A method for making a forming pin having a groove so as to enable a protruding portion of the forming pin, when driven into a workpiece, to be severed at the groove, comprising the steps of:
    (a) gripping an elongate wire firmly at a position wherein an end of the wire is exposed;
    (b) forming a head at the exposed end of the wire while said wire is gripped;
    (c) axially advancing the wire by a predetermined axial distance; and
    (d) simultaneously (1) forming a point on the advanced wire and (2) forming a groove upon the advanced wire for reducing the cross-section of the advanced wire.

2. The method of claim 1 further comprising a step of gripping the wire firmly while the point and the groove are being formed.

3. The method of claim 1 wherein the groove is formed by displacing material of the wire without removing any material at the groove.

4. The method of claim 1 further comprising a step of severing the forming pin from the remaining wire at the point simultaneously with forming the point and with forming the groove.

5. The method of claim 4 wherein the simultaneous steps of forming the point, forming the groove, and severing the forming pin from the remaining wire are effected by pinching the advanced wire between a pair of dies configured to form the point, form the groove, and sever the forming pin from the remaining wire at the point.

6. The method of claim 1 wherein the step of forming the groove includes simultaneously forming a pair of said grooves on opposite sides of the advanced wire.

7. In a machine for forming a forming pin from an elongate wire, a combination comprising:
   a pair of dies;
   means for closing the dies so as to pinch the wire between the dies such that an end portion of said wire protrudes outwardly from said dies;
   means for forming a head portion upon said end portion of said wire protruding outwardly from said dies;
   means for axially moving said wire such that said head portion is disposed axially remote from said dies; and
   means for simultaneously forming a point and a groove, for reducing the cross-section of the wire, upon portions of said wire remote from said head portion of said wire, when the dies are closed so as to pinch and retain the wire therebetween while said point and groove are formed.

8. The combination of claim 7 wherein the means for simultaneously forming the point and groove are configured to define means for severing the wire at the point simultaneous with forming the point and with forming the groove when the dies are moved so as to pinch the wire therebetween.

9. The combination as set forth in claim 8, wherein:
   said means for simultaneously forming said point and said groove, and for severing said wire, comprise a pair of bifurcated dies within each one of said bifurcated dies comprises a point-forming and pin-severing portion, and a groove-forming portion.

10. The combination of claim 7 wherein the means for simultaneously forming the point and groove are configured similarly to define means for simultaneously forming a pair of said grooves on opposite sides of the wire when the dies are moved so as to pinch the wire therebetween.

11. The combination as set forth in claim 7, wherein:
    said pair of dies together define a head-forming cavity within which said head portion of said wire is formed.

12. The combination as set forth in claim 7, wherein:
    said means for simultaneously forming said point and groove comprise a pair of bifurcated dies wherein each one of said bifurcated dies comprises a point-forming and groove-forming portion.

* * * * *